(12) United States Patent
Solin

(10) Patent No.: US 8,589,343 B2
(45) Date of Patent: Nov. 19, 2013

(54) SYSTEMS AND METHODS FOR DIGITAL FILE CHANGE MONITORING

(75) Inventor: David Allen Solin, Austin, TX (US)

(73) Assignee: Bladelogic, Inc., Houston, TX (US)

( * ) Notice: Subject to any disclaimer, the term of this patent is extended or adjusted under 35 U.S.C. 154(b) by 510 days.

(21) Appl. No.: 12/603,026

(22) Filed: Oct. 21, 2009

(65) Prior Publication Data

US 2010/0228750 A1   Sep. 9, 2010

Related U.S. Application Data

(60) Provisional application No. 61/157,125, filed on Mar. 3, 2009.

(51) Int. Cl.
*G06F 7/00* (2006.01)
*G06F 17/00* (2006.01)

(52) U.S. Cl.
USPC ............................ 707/615; 707/634; 707/690

(58) Field of Classification Search
USPC .......................................... 707/615, 634, 690
See application file for complete search history.

(56) References Cited

U.S. PATENT DOCUMENTS

| | | | |
|---|---|---|---|
| 6,438,642 B1 * | 8/2002 | Shaath | 711/100 |
| 6,604,104 B1 * | 8/2003 | Smith | 1/1 |
| 7,949,716 B2 * | 5/2011 | Alperovitch et al. | 709/206 |
| 2007/0288533 A1 * | 12/2007 | Srivastava et al. | 707/203 |

* cited by examiner

*Primary Examiner* — Mariela Reyes

(57) ABSTRACT

Systems and methods for monitoring changes to a digital file are described. Examples include a computer system for monitoring digital file changes that includes a processing unit that accepts a request to write an input data stream to a first file accessible within the computer system, and a storage device coupled to the processing unit and including a second file (the first file being a virtualized representation of the second file). The processing unit parses an input attribute from the input data stream, wherein the attribute includes an input identifier and an associated input value. The processing unit signals an event if the input attribute matches an identifier designated as a monitored attribute identifier of the second file.

29 Claims, 5 Drawing Sheets

SYSTEMS AND METHODS FOR DIGITAL FILE CHANGE MONITORING

RELATED APPLICATIONS

The present disclosure claims priority to U.S. Provisional Patent Application No. 61/157,125, entitled "A Method and System for Configuration File Change Monitoring" and filed Mar. 3, 2009, which is hereby incorporated by reference.

BACKGROUND

This disclosure relates generally to the field of automated configuration management of computer systems. Computer systems frequently use a number of different files to control, manage and track the configuration and operation of system hardware and software. It is thus important for a configuration management system to track changes to files that might affect the operation of such systems or that provide important and/or sensitive information related to such operation. These files may include system configuration files, log files, critical system files, and application data files, just to name a few examples. Tracking these files may be necessary to provide configuration change audit trails, to identify unauthorized changes, to identify intrusions and intrusion attempts, and to flag and track attempted and actual alterations of audit-related files. This type of file change monitoring is sometimes referred to as "file integrity monitoring." Existing approaches to file change monitoring include periodically parsing the files to identify changes (i.e., "polling" the files), kernel modifications that intercept write operations to the files, and agents that use execution tracing to identify write operations to the files.

One simple polling approach periodically calculates a message digest (also referred to as a checksum or hash code) based on the contents of a monitored file. If the file's hash code differs from a previously calculated and saved hash code, the file has changed and an event is generated indicating that further processing is required. This approach, however, results in events being triggered by any file change, regardless of the change's significance. A more sophisticated polling approach parses a monitored file and then models the file's content to determine whether specific file elements have been changed. This second approach avoids the lack of granularity of the first approach, and only generates events if a file element of interest has changed. Still, because both approaches use polling, there is a delay between the change occurrence and its detection. This detection latency becomes even greater as more files are monitored by a system using this approach, the polling interval being necessarily increased to reduce the load that the file monitoring tasks impose on a computer system.

The use of kernel modifications to intercept write operations directed to monitored files avoids latency issues, as write operations will immediately generate an event. Interception of write operations does not preclude modeling file contents, making it possible to identify the specific parameters being modified so that events are only generated for file element changes of interest. However, such kernel modifications are difficult to maintain across multiple platforms, as they may conflict with functional or security patches released over time by the operating system vendor. Consequently, many system users and operators may not be willing to allow such operating system modifications.

Agents that perform application tracing detect changes in monitored files by tracing the execution path of every task executing on a particular computer system and generating an event when a write-locked file handle is opened for a file of interest. While this approach also avoids polling latency issues, it can impose significant overhead on the monitored system. Furthermore, the use of an agent-based architecture, required for this approach, is not always desirable.

SUMMARY

Systems and methods for monitoring changes to a digital file are described. Examples include a computer system for monitoring digital file changes that includes a processing unit that accepts a request to write an input data stream to a first file accessible within the computer system, and a storage device coupled to the processing unit and including a second file (the first file being a virtualized representation of the second file). The processing unit parses an input attribute from the input data stream, wherein the attribute includes an input identifier and an associated input value. The processing unit signals an event if the input attribute matches an identifier designated as a monitored attribute identifier of the second file.

Other example embodiments include a method for monitoring digital file changes that includes receiving a request to write an input data stream to a first file, the first file being a virtualized representation of a second file. The method further includes parsing an input attribute from the input data stream (the attribute including an input identifier and an associated value) and signaling an event if the input identifier matches an identifier designated as a monitored attribute identifier of the second file. Still other example embodiments include a computer-readable storage medium including software that can be executed on a processor to cause the processor to perform the above-described method Yet other example embodiments include a networked configuration management system for monitoring digital file changes that includes a configuration management station, a computer system monitored by the configuration management station and a communication network that couples the configuration management station to the computer system. The monitored computer system includes a processing unit that accepts a request to write an input data stream to a first file accessible within the computer system, and a storage device coupled to the processing unit and including a second file (the first file being a virtualized representation of the second file). The processing unit parses an input attribute from the input data stream, wherein the attribute includes an input identifier and an associated input value. The processing unit signals an event and causes a message to be sent to the configuration management station if the input attribute matches an identifier designated as a monitored attribute identifier of the second file.

DETAILED DESCRIPTION

The present disclosure describes systems and methods for digital file change monitoring. Although the examples provided describe configuration file changes monitored by a configuration management station, the subject matter of the present disclosure is not so limited. The systems and methods described may be applied to any of a wide variety of different digital file types monitored by any number of different special and general purpose computer systems.

Figure 1:
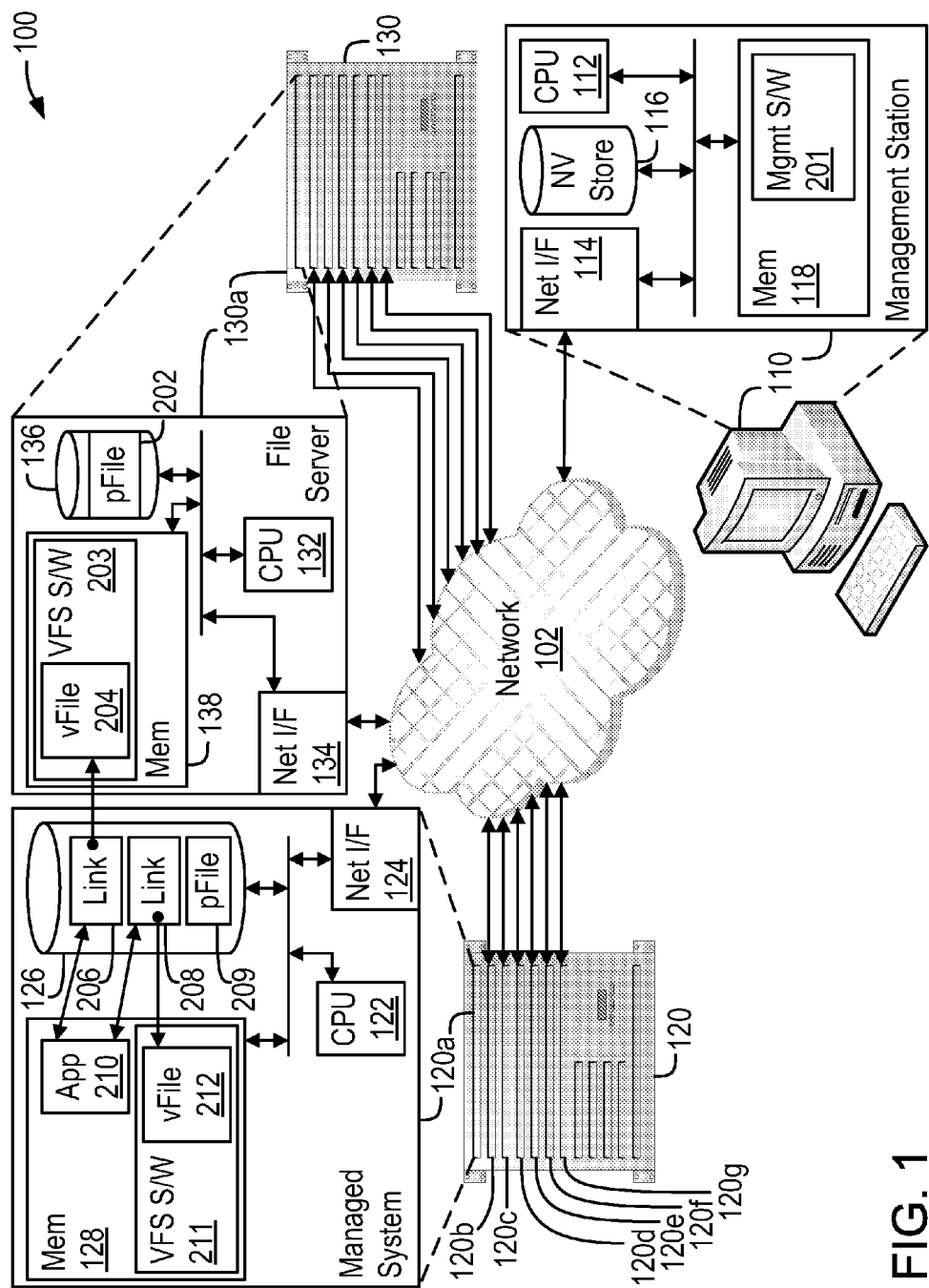
FIG. 1 illustrates an example system for monitoring digital file changes.

FIG. 1 illustrates an example file change monitoring system 100 that incorporates elements that enable a configuration management station to monitor changes in files (e.g., configuration files) throughout system 100. System 100 includes management station 110 coupled to network 102, which provides connectivity between the management station and one or more blade servers installed within blade enclosures 120 and 130 (e.g., blade servers 120a through 120g installed in enclosure 120). Such connectivity is provided via each system's network interface (e.g., network interfaces 114, 124 and 134). At least some of the blade servers are managed systems with files monitored using the methods described herein. In the example shown, blade server 130a is a managed system that is configured as a file server that provides network access to at least some virtualized files used by other managed systems. Although the example system of FIG. 1 shows the managed systems (including file server 130a) implemented as blade servers, any of a wide variety of computer systems and architectures may be used to implement the systems and methods described, including stand-alone computer systems, client computer systems and mainframe computer systems, just to name a few examples.

The managed systems may be implemented using any of a variety of known hardware platforms (e.g., Cell, PowerPC® and UltraSPARC® processor-based blade servers) and known operating systems (e.g., AIX®, HP-UX® and Linux®). (POWERPC and AIX are registered trademarks of the International Business Machine Corporation. ULTRASPARC is a registered trademark of SPARC International, Inc. HP-UX is a registered trademark of the Hewlett-Packard Development Company. LINUX is a registered trademark of Linus Torvalds.) Further, a server enclosure may include blade servers with the same hardware configuration and/or operating system, or alternatively may include a mix of blade servers with at least some blade servers having different hardware configurations and/or operating systems. While such hardware platforms and operating systems may include many different constituent components or modules, only those components and/or modules that are relevant to the discussion of the file change monitoring system are shown in FIG. 1 and described herein.

Example managed system 120a includes virtual file system (VFS) software 211, which is loaded into memory 128 and executed by CPU 122, and which may provide at least some of the file change monitoring functionality described herein. Managed system 120a also includes non-volatile storage device 126 (e.g., a hard disk drive), which includes pFile 209, link 206 and link 208. Application software 210, which is also loaded in memory 128 and executed by CPU 122, uses links 206 and 208 to respectively access vFiles 204 and 212. The links cause the virtual files to appear as if they are located within the hierarchy of a file system (not shown) resident on non-volatile storage device 126. Such links may be implemented, for example, using UNIX soft or hard file links.

VFS software 211 locally exposes one or more physical files (e.g., pFile 209) as virtual files (e.g., vFile 212) within the managed system 120a. With such virtual files, the data stored in a physical file is formatted and/or organized differently than the apparent data format and/or organization presented by a corresponding virtual file. Thus, for example, data presented by a virtual file as ASCII characters within a text file may in fact be stored as structured data within a relational database. The organization, structure and data typing required by the underlying database, however, is not visible to applications accessing the virtual file. Referring again to the example of FIG. 1, a virtual configuration file (virtual file 212) may be exposed as an ASCII text file while actually being stored in a physical file (pfile 209) using an attribute-value data model. Such a model facilitates monitoring specific configuration file attributes for changes, as described in more detail below. VFS software 211 monitors all accesses to the virtual configuration file, signaling an event and notifying management station 110 whenever a monitored virtual configuration file attribute is altered.

Example file server 130a similarly includes VFS software 203, which is loaded into memory 138 and executed by CPU 132, and which may also provide at least some of the file change monitoring functionality described herein. File server 130a includes non-volatile storage device 136, which stores the physical files (e.g., pFile 202) exposed by VFS software 203 as network accessible virtual files (e.g., vFile 204). The virtual file may be exposed using any of a number of network protocols such as the Network File System (NFS) protocol, the server message block/common Internet file system (SMB/CIFS) protocol, or the file transfer protocol (FTP), just to name a few examples. VFS software 203 also signals an event and notifies management station 110 whenever a monitored attribute of virtual configuration file 204 is changed. Although shown with a single integral storage device 136, other embodiments of file server 130a (or of any of the managed systems) may include any number of storage devices, both internal and external, and may include external storage devices coupled to the file server via a storage area network (not shown).

Example management station 110 may also be implemented using any of a variety of known hardware platforms (e.g., Intel and Advanced Micro Devices processor-based personal computers) and known operating systems (e.g., Linux and Microsoft Windows®). (WINDOWS is a registered trademark of the Microsoft Corporation.) Example management station 110 includes non-volatile storage device 116 (e.g., a hard disk drive) and management software 201, which is loaded into memory 118 and executed by CPU 112. The management software 201 receives change notifications, tracking and logging file change events indicated by the various VFS software instances executing on the managed systems within system 100.

As mentioned above, the VFS software may expose virtual ASCII text files, such as system configuration files, that are actually maintained within the corresponding physical files using an attribute-value data model. In such a model, data is structured as a collection of identifier-value tuples used to describe an entity (e.g., the configuration of a server application program) wherein each collection element represents an "attribute-value pair" (hereinafter referred to as an "attribute" for simplicity). Values may take any form, including numeric values, enumerated types, and text strings, just to name a few examples. An attribute-value data model may be represented using records within a database, wherein each attribute is represented by a database record, and each identifier-value tuple is represented by a corresponding record identifier and record value. Once converted to a set of identifier-value tuples, the resulting attributes may be organized, stored and configured such that access to any pair can be tracked, detected and controlled.

In at least some example embodiments, changes to attributes stored as database records may be tracked by configuring database triggers that cause a processing unit of a managed system to signal an event whenever the record (i.e., the attribute) is accessed. The database may further be configured to include a stored or registered procedure that executes in response to the signal. Such procedures can generate event messages that are transmitted or queued for transmission to the management station 110 of FIG. 1 and that identify any relevant information (e.g., the file and attribute modified, the system on which the file resides, the old value, the new value, the change date and time, the identity of the user modifying the attribute, etc.).

In another example embodiment, part of the VFS software may instead be configured to cause a processing unit of a managed system to signal an event (e.g., by generating a software interrupt) whenever a write to a monitored attribute is detected. The generated signal causes another part of the VFS software to execute (e.g., an interrupt service routine installed by the VFS software), which generates and transmits (or queues for transmission) the above-described event messages.

The use of an attribute-value data model thus enables changes to a monitored file to be detected immediately as they occur. Further, by storing each attribute within a monitored file as an individually identifiable and accessible entity, event signals can be limited to changes to specific attributes of interest within a file, and if desired further limited still to specific changes to that attribute (e.g., signaling an event when an attribute is enabled, but not when it is disabled). The attribute-value data model also allows changes to be restricted on an attribute-by-attribute basis to specific users, specific values, ranges of values and/or values matching the value of one or more other attributes. In other example embodiments, a plug-in framework is provided that allows a user to create a processing function that is called when an attribute is accessed and determines what actions are taken.

Figure 2:
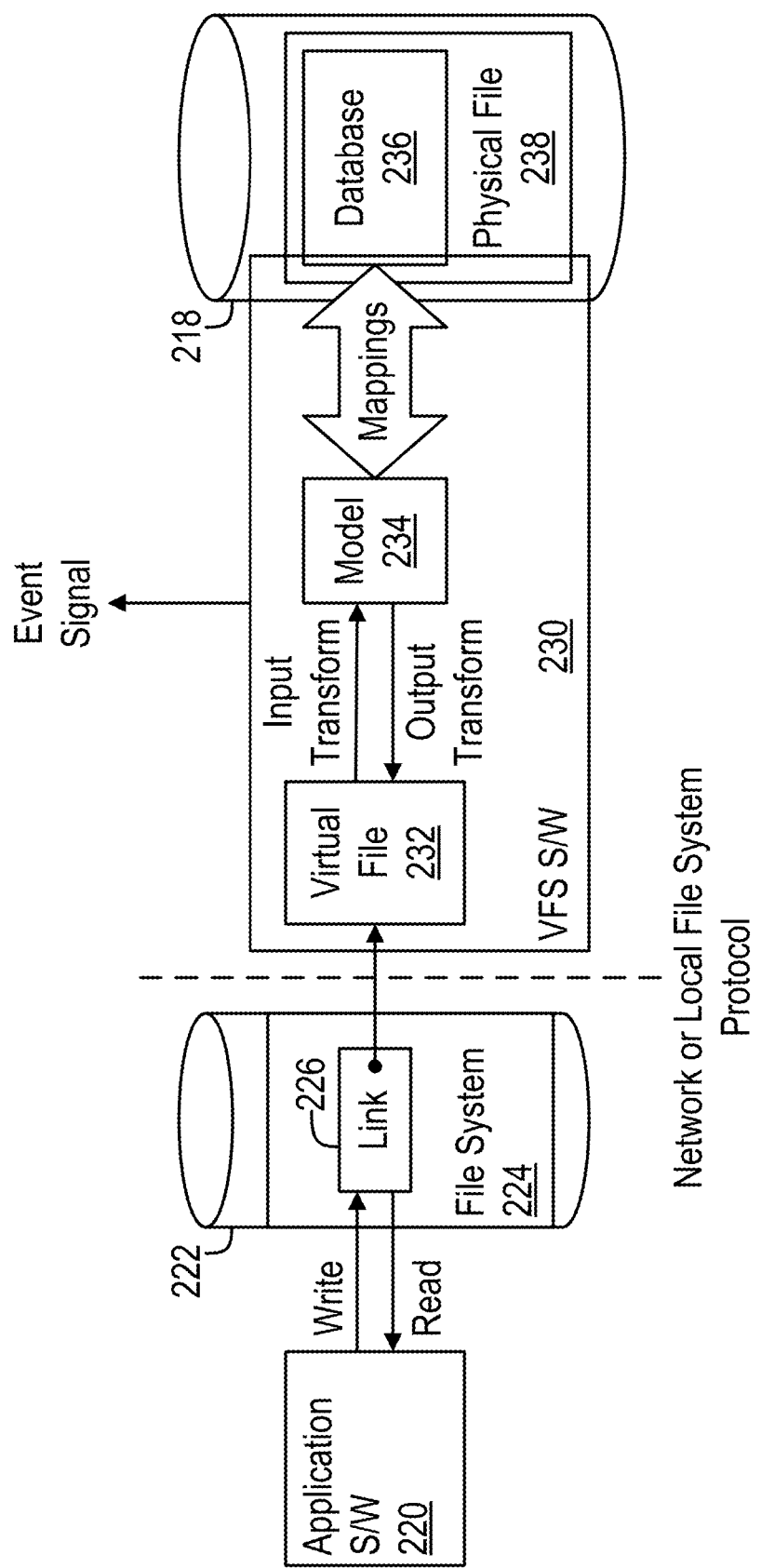
FIG. 2 illustrates a block diagram of an example interaction between an application and a virtualized file monitored using an attribute/value model.

FIG. 2 shows an example block diagram illustrating how an ASCII text configuration file may be stored using an attribute-value data model in a manner that is transparent to the application accessing the file. Application 220 accesses virtual file 232 via link 226 as if it were just another file within file system 224 of non-volatile storage device 222. Virtual file 232 is exposed and presented to application 220 as if the data were stored in the format normally expected for the file. For example, a configuration file for an Apache HTTP Server® application is an ASCII character file wherein the file includes lines of text that describe configuration attributes organized as an attribute identifier followed by an attribute value. (APACHE HTTP SERVER is a registered trademark of The Apache Software Foundation). Table 1 shows an example of a portion of an "httpd.conf" configuration file for an Apache HTTP server.

TABLE 1

Partial example of an ASCII text configuration file (httpd.conf)

\#
\# ServerType is either inetd or standalone. Inetd is only supported on UNIX platforms
\#
ServerType inetd
\#
\# ServerRoot is the top of the directory tree under which the server's configuration,
\# error and log files are kept (DO NOT ADD A SLASH AT THE END OF THE PATH)
\#
ServerRoot "/var/www"
\#

TABLE 1-continued

Partial example of an ASCII text configuration file (httpd.conf)

\# Timeout is the number of seconds before receives and sends time out
\#
Timeout 300

Each non-comment line of the configuration file of Table 1 represents an attribute and includes text describing an attribute identifier delimited by one or more blank space characters from an attribute value. Attributes are delimited from each other and from comments (indicated by a '#' as a line's first character) by "carriage-return/line-feed" (CR/LF) sequences at the end of each line. The file's text is read from database 236 of physical file 238 as a series of database records that are mapped to a collection of identifier-value tuples, each representing an attribute described by the line of text. Each example database record shown also includes a sequence identifier (e.g., an entry sequence number) in order to be able to maintain the sequence of each entry in the ASCII file being represented. Comments may be stored, for example, as an attribute using the first "#" character combined with an entry number as the identifier and the remaining characters as a single character string value.

In some example embodiments the attribute value may be saved as a character string. In other embodiments, attributes may be defined using other data types, allowing the attribute values to be saved as non-character values. Thus for example, the Timeout attribute can defined as being of type integer and "300" would be stored as an integer value rather than as a character string.

When a virtual configuration file needs to be modified a user executes application software 220 (e.g., an ASCII text editor), which accesses physical file 238 via link 226 and virtual file 232. Access to virtual file 232 may be performed locally using any one of the system's local file system protocols, or via a network using any number of network protocols to access the virtual file, as previously described. In each case, VFS software 230 is configured to communicate with application software 220 using the appropriate protocol, behaving as either a local file system driver or as network file system server.

Each record of database 236 within physical file 238 is retrieved in appropriate order from the database (e.g., in entry order as the entries originally appeared in an ASCII text file), mapped to an ordered set of identifier-value elements within attribute-data model 234, and transformed into an ASCII data stream that is output as the data is read from virtual file 232 by application software 220. The ASCII data stream is loaded into a working memory buffer, where modifications are stored until the user commands application program 220 to write the buffer contents back to the file. The write command causes the buffer contents to be written to the file as an ASCII data stream, which is transformed into an ordered set of identifier-value elements and mapped into a series of database records, each of which may be written back to database 236 of physical file 238.

In at least some examples of VFS software 230, write access to a file may be controlled and/or restricted on an attribute-by-attribute basis. Access to an attribute may be conditioned on one or more access permissions (e.g., is a particular user authorized to change a specific attribute), on the software's operational state (e.g., whether modifications to the attribute are allowed while the application is running), or on the new attribute value's validity (e.g., whether a value being written to a date field is a valid date), just to name a few examples. These conditions may be imposed in addition to any access controls already imposed by other parts of the system, such as the access controls and permission structures of file system 224. File read access may also be similarly controlled and/or restricted on an attribute-by-attribute basis.

Figure 3:
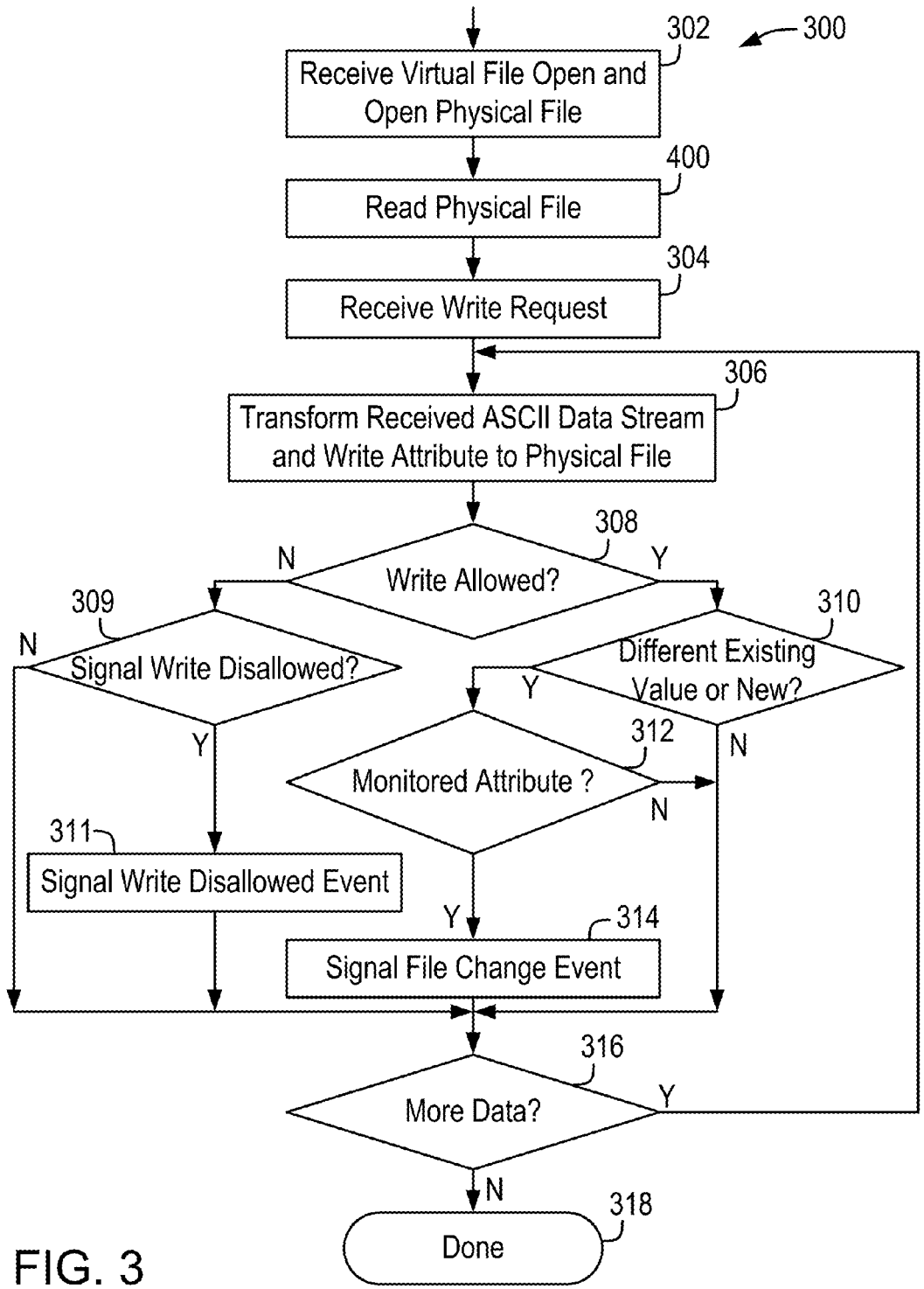
FIG. 3 illustrates an example of a write of a monitored virtual file.

FIG. 3 shows an example method 300 that illustrates in detail the read-modify-write operation described above. Referring to both FIGS. 2 and 3, when first executed application software 220 opens virtual configuration file 232 via link 226. The file open is received by VFS software 230, which causes VFS software 230 to open corresponding physical file 238 (block 302, FIG. 3). VFS software 230 then reads the content of physical file 238 (block 400, described in more detail below), loading the content into a working buffer in memory (not shown). At some later time, the user commands application software 220 to write any changes made back to the file, which causes VFS software 230 to receive a write request (block 304) from application software 220. VFS software 230 then receives the data written to virtual file 232 and parses the received ASCII data stream, transforming the parsed data into the identifier-value format of model 234 (block 306). VFS software 230 subsequently maps the attribute identifier and attribute value to a corresponding database record name and one or more database record value fields, and attempts to write each of the resulting database records (i.e., each attribute) to database 236 within physical file 238 (block 306).

If an attempted write of an attribute is not allowed because of one or more restrictions applicable to that attribute (block 308), the attribute is not written and is skipped. Such restrictions may be configured as conditions that control whether access to an attribute is allowed or denied. Access may be allowed/denied if one condition is met, if all conditions are met, or if one or more logical combinations of conditions is met (e.g., logical AND, OR, XOR, etc.). If the VFS software is configured to generate signals to configuration management station 110 when an attribute write is disallowed (block 309), such a signal is generated (block 311) and a corresponding message is subsequently transmitted to management station 110. Such a signal may be used, for example, to identify possible security violations. After skipping the attribute write and optionally signaling a write disallowed event, if additional attributes still need to be written (block 316) additional received data is transformed and a write of another attribute is attempted (block 306). If an attempted write of an attribute is allowed (block 308), the attribute is checked to determine whether the attribute being written already exists and whether the value being written is different from the current value for an existing attribute.

If the values are not different (block 310), the write is skipped and no file change event signal is generated, as there has been no change to the attribute. If the values are different or the attribute is new (block 310), i.e., the attribute's identifier does not match the identifier of an attribute already stored within database 236 of physical file 238, the attribute is checked to determine if it is a monitored attribute. This may be done, for example, by comparing the attribute's identifier to a list of identifiers within database 236 designated as monitored attribute identifiers for physical file 238. If the attribute's identifier matches a monitored attribute identifier, indicating that the attribute is flagged for monitoring (block 312), a signal is generated indicating that the attribute has been changed (block 314), and a message is sent to management station 110 as previously described. In at least some example embodiments, a signal is generated only if the difference between the attribute value and the stored value exceeds a threshold value, such that only significant changes to a value are tracked. If the attribute is not flagged for monitoring (block 312), no file change event signal is generated, regardless of whether the attribute has changed or not. Once the attribute is processed a check is again performed to determine if more file data remains to be processed and possibly written to physical file 238. If data remains (block 316), steps 306 through 314 are repeated as needed. If no data remains (block 316), the write to physical file 238 is complete, ending the method (block 318).

Figure 4:
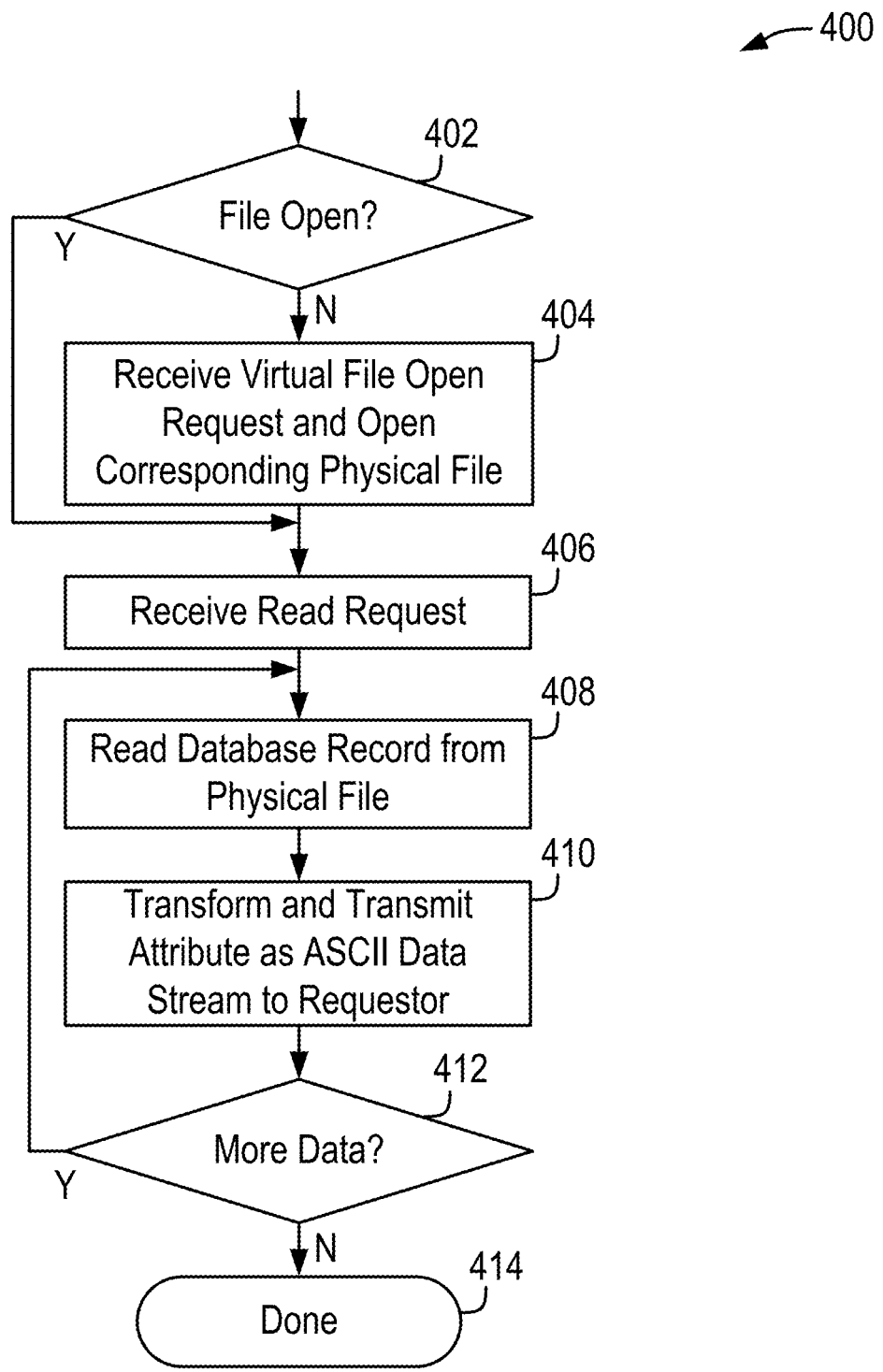
FIG. 4 illustrates an example of a read of a monitored virtual file.

FIG. 4 shows an example method 400 that illustrates in detail the read operation of FIG. 3. Although the read operation of method 400 is shown in FIG. 3 as part of a write operation, method 400 may also be performed as a standalone read operation. Referring to both FIGS. 2 and 4, method 400 begins by checking whether or not the file being read is already open (block 402). If the file has not yet been opened, VFS software 230 receives a request to open virtual file 232 from application software 220, which causes VFS software 230 to open physical file 238 (block 404). Once the virtual and physical files are open (block 404), or if they were already open (block 402), VFS software 230 receives a read request from application software 220 (block 406), which causes VFS software 230 to read a database record (e.g., in entry order) from database 236 within physical file 238 (block 408). The record identifier and record value are mapped to a corresponding identifier-value pair within attribute-value data model 234, and the identifier-value pair is transformed into an attribute represented as part of the ASCII data stream transmitted to application software 220 in response to the read request (block 410). If more database records remain to be read (block 412), the database record read, identifier-value pair mapping and transformation, and ASCII data stream transmission is repeated for each database record remaining (blocks 408-410) until no more database records remain (block 412), ending method 400 (block 414).

The above-described methods and systems thus provide event-driven change monitoring of important system files, such as the example configuration file described, on an attribute-by-attribute basis. The event-driven nature of these methods and systems allows changes to be detected when they occur. The ability to selectively monitor individual attributes limits the generation of change events to only changes of interest. This reduces the processing overhead imposed by monitoring-related tasks on both the monitored systems and the managements station, as compared to the overhead associated with processing change events for every change made to a file. The ability to intercept file read and write operations on an attribute-by-attribute basis as they occur further facilitates the implementation of enhanced security, whereby access to individual file attributes may be controlled and/or restricted. Such enhanced security may be implemented in addition to any existing security mechanisms implemented and enforced by the operating system and any other software executing on a monitored system within the file change monitoring systems described. The use of virtual files further allows implementing such systems and methods without the need for kernel modifications.

Figure 5:
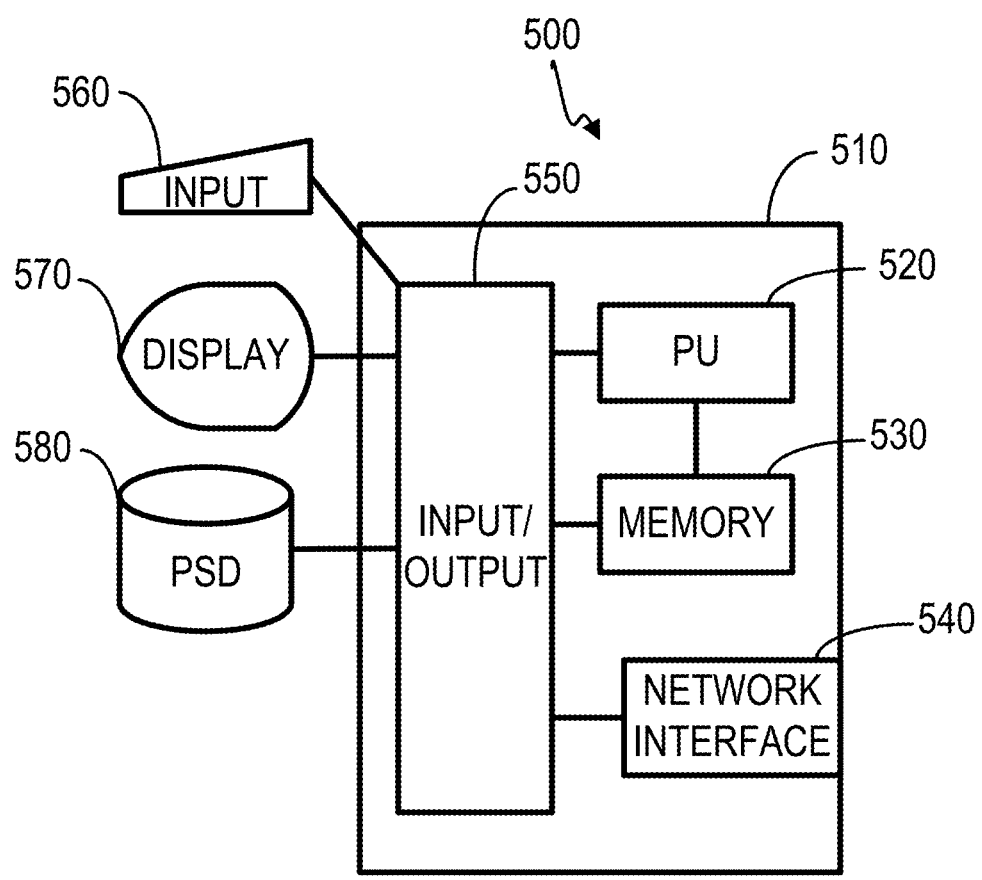
FIG. 5 illustrates an example of a computer system suitable for use as a managed system, file server and/or a management station.

Referring now to FIG. 5, an example computer system 500 is shown. The example computer system may be used as a configuration management station (e.g., management station 110 of FIG. 1), and one or more example computer systems 500 may be included in a blade chassis (e.g., managed systems 120a-120g and file server 130a of FIG. 1). Example computer system 500 may include a programmable control device 510 which may be optionally connected to input 560 (e.g., a keyboard, mouse, touch screen, etc.), display 570 or non-volatile storage device (PSD) 580 (sometimes referred to as direct access storage device DASD). Also, included with programmable control device 510 is a network interface 540 for communication via a network with other computing and corporate infrastructure devices (see, e.g., FIG. 1). Note that network interface 540 may be included within programmable control device 510 or be external to programmable control device 510. In either case, programmable control device 510 will be communicatively coupled to network interface 540. Also note that non-volatile storage unit 580 represents any form of non-volatile storage including, but not limited to, all forms of optical and magnetic storage elements including solid-state storage.

Programmable control device 510 may be included in a computer system and be programmed to perform methods in accordance with this disclosure (e.g., example methods 300 and 400 illustrated in FIGS. 3 and 4). Programmable control device 510 includes a processing unit (PU) 520, input-output (I/O) interface 550 and memory 530. Processing unit 520 may include any programmable controller device including, for example, processors of an IBM mainframe (such as a quad-core z10 mainframe microprocessor). Alternatively, in non mainframe systems, examples of processing unit 520 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 530 may include one or more memory modules and include random access memory (RAM), read only memory (ROM), programmable read only memory (PROM), programmable read-write memory, and solid state memory. One of ordinary skill in the art will also recognize that PU 520 may also include some internal memory including, for example, cache memory.

In addition, acts in accordance with the methods of FIGS. 3 and 4 may be performed by an example computer system 500 including a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Storage devices, sometimes called "memory medium," "computer-usable medium" or "computer-readable storage medium," are suitable for tangibly embodying program instructions and may include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as network 102 and/or a wireless link.

Although the examples described include software executing on individual, self-contained physical computers, software that implements the functionality described herein is not limited to such physical computers. Those of ordinary skill in the art will recognize that other computer system implementations may be suitable for executing software that implements at least some of the functionality described herein (e.g., VFS software 230 of FIG. 2). These implementations may include virtualized computer systems (e.g., systems implemented using VMware® Workstation software by VMware), and distributed computer systems (e.g., diskless workstations and netbooks), just to name a few examples. (VMWARE is a registered trademark of VMware, Inc.) All such implementations and variations of a computer system are contemplated by the present disclosure.

The above discussion is meant to illustrate the principles of at least some example embodiments of the claimed subject matter. Various features are occasionally grouped together in a single embodiment for the purpose of streamlining the disclosure. This method of disclosure is not to be interpreted as reflecting an intention that the embodiments of the claimed subject matter require more features than are expressly recited in each claim.

Various changes in the details of the illustrated operational methods are possible without departing from the scope of the claims that follow. For instance, illustrative flow chart steps or process steps of FIGS. 3 and 4 may perform the identified steps in an order different from that disclosed here. Alternatively, some embodiments may combine the activities described herein as being separate steps. Similarly, one or more of the described steps may be omitted, depending upon the specific operational environment the method is being implemented in.

Other variations and modifications will become apparent to those of ordinary skill in the art once the above disclosure is fully appreciated. For example, although the example managed systems are described as blade servers, such systems are not limited to blade servers or servers in general, and may include any of a wide variety of physical and/or virtual computer systems. Also, although the databases and physical files are described within the context of disk-based file systems, such databases and physical files may also be implemented as part of a memory-based file system (e.g., a RAM disk). Further, although shown as a single software module, the VFS software described may also be implemented as two or more separate software modules that communicate with each other (e.g., using shared memory or inter-process communication (IPC) mechanisms). Additionally, the methods and systems shown and described are not limited to virtualized ASCII files, and may be applied to any file used to store data that can be represented using the attribute-value data model described. It is intended that the following claims be interpreted to include all such variations and modifications.

What is claimed is:

1. A computer system that monitors digital file changes, comprising:
   a processing unit having one or more processors, the processing unit configured to receive a request to write an input data stream of a text format to a text configuration file accessible within the computer system; and
   a storage device coupled to the processing unit and comprising a relational database including a physical file having an attribute-value format, the text configuration file being a virtualized representation of the physical file, the physical file including a plurality of attribute identifiers, each attribute identifier having a stored identifier and stored value corresponding to a portion of the text configuration file;
   wherein the processing unit is configured to convert the input data stream of the text format to an input data stream of the attribute-value format compatible to the physical file, the input data stream of the attribute-value format including an input attribute having an input identifier and an associated input value;

wherein the processing unit is configured to determine whether the input identifier matches the stored identifier in the physical file and, if so, whether the input value is different from the stored value;

wherein the processing unit is configured to determine whether the attribute identifier corresponding to the matched stored identifier is a monitored attribute identifier from a list of monitored attribute identifiers when the input value is determined as different from the stored value, the monitored attribute identifier being an attribute flagged for monitoring; and wherein the processing unit is configured to signal a file change event based on the attribute identifier corresponding to the matched stored identifier being determined as the monitored attributed identifier, the file change event indicating that the request to write the input data stream is monitored.

2. The computer system of claim 1, wherein the processing unit is further configured to overwrite the stored value with the input value.

3. The computer system of claim 1, wherein the processing unit is further configured to determine a difference between the input value and the stored value as exceeding a threshold value.

4. The computer system of claim 1, wherein the processing unit is further configured to write the input value to the physical file if each of one or more conditions associated with the physical file are met, and further writes the input identifier to the physical file if each of the one or more conditions are met and the input identifier does not match an identifier value already stored within the physical file.

5. The computer system of claim 1, wherein the processing unit is further configured to write the input value to the physical file if at least one of one or more conditions associated with the physical file is met, and further writes the input identifier to the physical file if at least one of the one or more conditions is met and the input identifier does not match an identifier value already stored within the physical file.

6. The computer system of claim 1, wherein the stored identifier corresponds to a database record name and the stored value corresponds to a database record value of the relational database.

7. The computer system of claim 1, wherein the processing unit further receives a request to read data from the text configuration file and in response reads an attribute identifier from the physical file; and wherein the processing unit further converts the stored identifier and the stored value into the text format compatible with the the text configuration file, and outputs the converted stored identifier and converted stored value as text file data within an output data stream.

8. A method for monitoring digital file changes, comprising:

receiving a request to write an input data stream of a text format to a text configuration file, the text configuration file being a virtualized representation of a physical file having an attribute-value format, the physical file associated with a relational database and including a plurality of attribute identifiers, each attribute identifier having a stored identifier and stored value corresponding to a portion of the text configuration file;

converting the input data stream of the text format to an input data stream of the attribute-value format compatible to the physical file, the input data stream of the attribute-value format including an input attribute having an input identifier and an associated value;

determining whether the input identifier matches the stored identifier in the physical file and, if so, whether the input value is different from the stored value;

determining whether the attribute identifier corresponding to the matched stored identifier is a monitored attribute identifier from a list of monitored attribute identifiers when the input value is determined as different from the stored value, the monitored attribute identifier being an attribute flagged for monitoring; and signaling a file change event based on the attribute identifier corresponding to the matched stored identifier being determined as the monitored attribute identifier, the file change event indicating that the request to write the input data stream is monitored.

9. The method of claim 8, further comprising:
overwriting the stored value with the input value.

10. The method of claim 8, wherein the determining whether the input value is different from the stored value includes determining a difference between the input value and the stored value as exceeding a threshold value.

11. The method of claim 8, further comprising:
writing the input value to the physical file if each of one or more conditions associated with the physical file is met; and writing the input identifier to the physical file if each of the one or more conditions is met and the input identifier does not match an identifier already stored in the physical file.

12. The method of claim 8, further comprising:
writing the input value to the physical file if at least one of one or more conditions associated with the physical file is met; and writing the input identifier to the physical file if at least one of the one or more conditions is met and the input identifier does not match an identifier already stored in the physical.

13. The method of claim 8, wherein the stored identifier corresponds to a database record name and the stored value corresponds to a database record value of the relational database.

14. The method of claim 8, further comprising:
receiving a request to read data from the text configuration file;

responding to the request by reading an attribute identifier from the physical file;

converting the stored identifier and the stored value into the text format compatible with of the text configuration file; and outputting the converted stored identifier and converted stored value as data within an output data stream from the text configuration file.

15. The method of claim 8, wherein a virtual file system accessible within the computer system comprises the text configuration file.

16. The method of claim 8, wherein a virtual file system accessible by one or more computer systems across a network comprises the text configuration file.

17. The method of claim 16, wherein the text configuration file is accessible using at least one network protocol selected from the group consisting of the network file system (NFS) protocol, the server message block/common Internet file system (SMB/CIFS) protocol, and the file transfer protocol (FTP).

18. A computer-readable storage medium comprising software that can be executed on a processor to cause the processor to perform the method of claim 8.

19. A networked configuration management system that monitors digital file changes, comprising:
- a configuration management station;
- a computer system monitored by the configuration management station, comprising:
  - a processing unit having one or more processors, the processing unit configured to receive a request to write an input data stream of a text format to a text configuration file; and
  - a storage device coupled to the processing unit and comprising a relational database including a physical file having an attribute-value format, the text configuration file being a virtualized representation of the physical file, the physical file including a plurality of attribute identifiers, each attribute identifier having a stored identifier and stored value corresponding to a portion of the text configuration file;
- a communication network that couples the configuration management station to the computer system;
- wherein the processing unit is configured to convert the input data stream of the text format to an input data stream of the attribute-value format compatible to the physical file, the input data stream of the physical format including an input attribute having an input identifier and an associated input value;
- wherein the processing unit is configured to determine whether the input identifier matches the stored identifier in the physical file and, if so, whether the input value is different from the stored value;
- wherein the processing unit is configured to determine whether the attribute identifier corresponding to the matched stored identifier is a monitored attribute identifier from a list of monitored attribute identifiers when the input value is determined as different from the stored value, the monitored attribute identifier being an attribute flagged for monitoring;
- wherein the processing unit is configured to signal a file change event and cause a message to be sent to the configuration management station based on the attribute identifier corresponding to the matched stored identifier being determined as the monitored attribute identifier, the file change event indicating that the request to write the input data stream is monitored.

20. The networked configuration management system of claim 19, wherein the processing unit is further configured to overwrite the stored value with the input value.

21. The networked configuration management system of claim 19, wherein the processing unit is further configured to determine a difference between the input value and the stored value as exceeding a threshold value.

22. The networked configuration management system of claim 19, wherein the processing unit writes the input value to the file if each of one or more conditions associated with the physical file are met, and further writes the input identifier to the physical file if each of the one or more conditions are met and the input identifier does not match an identifier value already stored within the physical file.

23. The networked configuration management system of claim 19, wherein the processing unit writes the input value to the physical file if at least one of one or more conditions associated with the physical file is met, and further writes the input identifier to the physical file if at least one of the one or more conditions is met and the input identifier does not match an identifier value already stored within the physical file.

24. The networked configuration management system of claim 19, wherein the stored identifier corresponds to a database record name and the stored value corresponds to a database record value of the relational database.

25. The networked configuration management system of claim 19, wherein the processing unit causes a message to be sent to the configuration management station if a write of the input attribute to the physical file is disallowed.

26. The networked configuration management system of claim 19, wherein the processing unit further receives a request to read data from the text configuration file and in response reads an attribute identifier from the physical file; and
- wherein the processing unit further converts the stored identifier and the stored value into the text format compatible with the configuration text file, and outputs the converted stored identifier and converted stored value as text file data within an output data stream.

27. The networked configuration management system of claim 19, wherein a virtual file system accessible within the computer system comprises the text configuration file.

28. The networked configuration management system of claim 19, further comprising:
- one or more computer systems coupled to the communication network;
- wherein the monitored computer system comprises a virtual file system accessible by the one or more computer systems across the communication network; and
- wherein the virtual file system comprises the text configuration file.

29. The networked configuration management system of claim 28, wherein the text configuration file is accessible using at least one network protocol selected from the group consisting of the network file system (NFS) protocol, the server message block/common Internet file system (SMB/CIFS) protocol, and the file transfer protocol (FTP).

* * * * *

UNITED STATES PATENT AND TRADEMARK OFFICE
CERTIFICATE OF CORRECTION

PATENT NO. : 8,589,343 B2  
APPLICATION NO. : 12/603026  
DATED : November 19, 2013  
INVENTOR(S) : David Allen Solin Page 1 of 1

It is certified that error appears in the above-identified patent and that said Letters Patent is hereby corrected as shown below:

In the Claims

In column 11, line 52, in claim 7, after "the" delete "the".

In column 12, line 40, in claim 12, delete "physical." and insert -- physical file. --, therefor.

In column 12, line 51, in claim 14, after "with" delete "of".

Signed and Sealed this  
Twenty-fifth Day of March, 2014

Michelle K. Lee  
*Deputy Director of the United States Patent and Trademark Office*